(12) United States Patent
Kishi (10) Patent No.: US 8,546,044 B2
(45) Date of Patent: Oct. 1, 2013

(54) POLYMER ELECTROLYTE, MEMBRANE ELECTRODE ASSEMBLY AND FUEL CELL

(75) Inventor: Katsuyuki Kishi, Tokyo (JP)

(73) Assignee: Toppan Printing Co., Ltd. (JP)

( * ) Notice: Subject to any disclaimer, the term of this patent is extended or adjusted under 35 U.S.C. 154(b) by 617 days.

(21) Appl. No.: 12/565,463

(22) Filed: Sep. 23, 2009

(65) Prior Publication Data

US 2010/0075196 A1     Mar. 25, 2010

(30) Foreign Application Priority Data

Sep. 24, 2008  (JP) .................................. 2008-244085
Sep. 25, 2008  (JP) .................................. 2008-245212

(51) Int. Cl.
*H01M 8/10*        (2006.01)

(52) U.S. Cl.
USPC ............................. 429/493; 429/479; 429/491

(58) Field of Classification Search
USPC .......................................... 429/493, 479, 491
See application file for complete search history.

(56) References Cited

U.S. PATENT DOCUMENTS 5,403,675 A  *  4/1995  Ogata et al. .................... 429/493
2007/0196721 A1 *  8/2007  Lee et al. ......................... 429/42

FOREIGN PATENT DOCUMENTS

| JP | 11-116679 | 4/1999 |
|----|-----------|--------|
| JP | 2004-010677 | 1/2004 |
| JP | 2007-070563 | 3/2007 |
| JP | 2007-329120 | 12/2007 |

* cited by examiner

*Primary Examiner* — Patrick Ryan
*Assistant Examiner* — Julian Anthony
(74) *Attorney, Agent, or Firm* — Squire Sanders (US) LLP (57) ABSTRACT

The present invention easily provides a polymer electrolyte that exhibits high proton conductivity under low humidity conditions and has a high level of durability and mechanical strength. The polymer electrolyte is produced by mixing proton-conducting sulfonated polyethersulfone C1, sulfonated polyphenylene sulfide C2 or sulfonated poly(4-phenoxybenzoyl-1,4-phenylene) C3 having a sulfonic acid group A as a protic acid group with 1,4-benzenedimethanol B as a crosslinking agent having a methylol group and heat-treating the mixture so that a reaction can be carried out. The polymer electrolyte includes a plurality of proton-conducting sulfonated polyethersulfone moieties C chemically bonded at their aromatic ring moieties other than the sulfonic acid group A to one another through a residue B' of 1,4-benzenedimethanol.

13 Claims, 5 Drawing Sheets

POLYMER ELECTROLYTE, MEMBRANE ELECTRODE ASSEMBLY AND FUEL CELL

CROSS REFERENCE TO RELATED APPLICATION

This application is based on and claims the benefit of priority from the Japanese Patent Applications number 2008-244085, filed on Sep. 24, 2008; and 2008-245212, filed on Sep. 25, 2008, the entire contents of which are incorporated herein by reference.

BACKGROUND OF THE INVENTION

1. Field of the Invention

The present invention relates to polymer electrolytes for use in polymer electrolyte fuel cells, and also to membrane-electrode assemblies and fuel cells.

2. Description of the Related Art

In recent years, fuel cells have been attracting attention as an effective solution to environmental or energy problems. Fuel cells use an oxidant such as oxygen to oxidize the fuel such as hydrogen and convert the chemical energy produced by the oxidation into electric energy.

According to the electrolyte type, fuel cells are classified into an alkali type, a phosphoric acid type, a polymer electrolyte type, a molten carbonate type, a solid oxide type, and the like. Polymer electrolyte fuel cells (PEFC) are expected to be applicable to portable power sources, household power sources, and vehicle power sources, because they can work at low temperature, have high power density and be made small and light.

Electrolytes that have practical stability and are used for polymer electrolyte fuel cells (PEFC) include perfluoropolymer electrolytes typified by Nafion (a registered trademark of DuPont; hereinafter the same shall apply) and various hydrocarbon-based electrolytes. However, these electrolytes have the problem of high cost, although the electrolytes exhibit high proton conductivity.

In order to solve the problem, inexpensive hydrocarbon-based electrolytes have been developed. For example, Japanese Patent Application Laid-Open (JP-A) Nos. 11-116679 and 2007-329120 report some sulfonated engineering plastics. However, these electrolytes have reduced proton conductivity under low humidity conditions, although the electrolytes exhibit high proton conductivity under high humidity conditions. A method of increasing the concentration of the protic acid group has been attempted to produce high proton conductivity even under low humidity conditions. However, the increase in the concentration of the protic acid group has a problem in which the water resistance of the film is reduced so that the mechanical strength to withstand practical use cannot be achieved.

On the other hand, there is proposed a method of crosslinking an electrolyte to improve the durability, water resistance and mechanical strength of a hydrocarbon-based electrolyte membrane (JP-A No. 2007-70563). However, since the crosslinking reaction proceeds with the protic acid group bonded to the proton-conducting polymer, the hydrogen ion exchange capacity of the crosslinked electrolyte is decreased with increasing crosslink density. Therefore, this method has the problem of a reduction in proton conductivity. The crosslinked electrolyte proposed in JP-A No. 2004-10677 has a problem in which a certain crosslink group has to be introduced into the electrolyte, so that the crosslinked electrolyte is not easy to produce.

<Patent document 1>JP-A-H11-116679
<Patent document 2>JP-A-2007-329120
<Patent document 3>JP-A-2007-070563
<Patent document 4>JP-A-2004-010677

SUMMARY OF THE INVENTION

An object of the present invention is to provide a polymer electrolyte that can be easily produced by crosslinking a general-purpose engineering plastic electrolyte such as a polyethersulfone, polyphenylene sulfide, or polyphenylene electrolyte without reducing the ion exchange capacity, exhibits high proton conductivity, and has a high level of durability and mechanical strength.

Another object of the invention is to provide a membrane-electrode assembly and a fuel cell each using the polymer electrolyte.

As a result of investigations to solve the problems, the inventors have made the invention, based on the finding that an electrolyte having a high level of durability and mechanical strength can be easily produced at low cost by chemically bonding a general-purpose engineering plastic electrolyte such as a polyethersulfone, polyphenylene sulfide or polyphenylene electrolyte to a crosslinking agent through a moiety other than the protic acid group.

In addition, the electrolyte and the crosslinking agent can be chemically bonded to each other by heating, and therefore, an electrolyte having high durability can be easily provided.

In order to solve the problems above, a first aspect of the present invention is a polymer electrolyte which includes, as a main component, a crosslinked polymer that has a protic acid group in its molecular chain and is produced by a crosslinking reaction between a proton-conducting polymer and a crosslinking agent, wherein the crosslinking agent reacts with part of the proton-conducting polymer other than the protic acid group, and the proton-conducting polymer has a structural unit represented by formula (1a) or (1b):

[Formula 1]

Formula 1(a)

Formula 1(b)

A second aspect of the present invention is the polymer electrolyte according to the first aspect of the present invention, wherein the proton-conducting polymer has a hydrogen ion exchange capacity of 0.5 meq/g to 5 meq/g.

A third aspect of the present invention is the polymer electrolyte according to the first aspect of the present invention, wherein the crosslinking agent has at least one methylol group in its molecule.

A fourth aspect of the present invention is the polymer electrolyte according to the first aspect of the present invention, wherein the proton-conducting polymer and the crosslinking agent are chemically bonded to each other by heating.

A fifth aspect of the present invention is the polymer electrolyte according to the fourth aspect of the present invention, wherein the heating is performed at a temperature of 60° C. to 250° C.

A sixth aspect of the present invention is a membrane-electrode assembly which includes the polymer electrolyte according to the first aspect of the present invention.

A seventh aspect of the present invention is a fuel cell which includes the polymer electrolyte according to the first aspect of the present invention.

A eighth aspect of the present invention is a polymer electrolyte which includes, as a main component, a crosslinked polymer that has a protic acid group in its molecular chain and is produced by a crosslinking reaction between a proton-conducting polymer and a crosslinking agent, wherein the crosslinking agent reacts with part of the proton-conducting polymer other than the protic acid group, and the proton-conducting polymer has a structural unit represented by formula (2):

[Formula 2]

wherein A represents an electron-withdrawing group, B represents an electron-donating group, m and n each represent an integer of 0 to 10, and x and y each represent an integer of 1 to 4.

A ninth aspect of the present invention is the polymer electrolyte according to the eighth aspect of the present invention, wherein A represents —CO— in formula (2).

A tenth aspect of the present invention is the polymer electrolyte according to the eighth aspect of the present invention, wherein B represents —CO— in formula (2).

A eleventh aspect of the present invention is the polymer electrolyte according to the eighth aspect of the present invention, wherein formula (2) represents sulfonated (4-phenoxybenzoyl-1,4-phenylene).

A twelfth aspect of the present invention is the polymer electrolyte according to the eighth aspect of the present invention, wherein the proton-conducting polymer has a hydrogen ion exchange capacity of 0.5 meq/g to 5 meq/g.

A thirteenth aspect of the present invention is the polymer electrolyte according to the eighth aspect of the present invention, wherein the crosslinking agent has at least one methylol group in its molecule.

A fourteenth aspect of the present invention is the polymer electrolyte according to the eighth aspect of the present invention, wherein the proton-conducting polymer and the crosslinking agent are chemically bonded to each other by heating.

A fifteenth aspect of the present invention is the polymer electrolyte according to the fourteenth aspect of the present invention, wherein the heating is performed at a temperature of 60° C. to 250° C.

A sixteenth aspect of the present invention is a membrane-electrode assembly which includes the polymer electrolyte according to the eighth aspect of the present invention.

A seventeenth aspect of the present invention is a fuel cell which includes the polymer electrolyte according to the eighth aspect of the present invention.

The polymer electrolyte according to the first aspect of the present invention includes a crosslinked polymer electrolyte membrane including, as a main component, a crosslinked polymer that has a protic acid group in its molecular chain and is produced by a crosslinking reaction between a proton-conducting polymer and a crosslinking agent, wherein the crosslinking agent reacts with part of the proton-conducting polymer other than the protic acid group, and the proton-conducting polymer includes a structural unit represented by formula (1a) or formula (1b) below. The proton-conducting polymer is bonded through a moiety other than the protic acid group. This offers the remarkable advantages that the polymer can be crosslinked without reducing the ion exchange capacity or the proton conductivity and a polymer electrolyte having high durability can be produced at low cost.

[Formula 3]

The polymer electrolyte according to the second aspect of the present invention is characterized in that the proton-conducting polymer has a hydrogen ion exchange capacity of 0.5 meq/g to 5 meq/g. This offers the additional remarkable advantage that the polymer electrolyte can exhibit high proton conductivity and form a fuel cell with reduced internal resistance and high power density.

The polymer electrolyte according to the third aspect of the present invention is characterized in that the crosslinking agent has at least one methylol group in its molecule. The reaction proceeds not through the protic acid group of the proton-conducting polymer. This offers the additional remarkable advantage that the proton conductivity is not reduced by the reaction and the reaction is easily carried out by heating.

The polymer electrolyte according to the fourth aspect of the present invention is characterized in that the proton-conducting polymer and the crosslinking agent are chemically bonded to each other by heating. The reaction can be easily carried out by heating. This offers the additional remarkable advantage that the reaction can be easily and economically carried out with a simple apparatus or process.

The polymer electrolyte according to the fifth aspect of the present invention is characterized in that the heating is performed at a temperature of 60° C. to 250° C. This offers the additional remarkable advantage that the reaction can be easily carried out, while the elimination or decomposition reaction of the protic acid group of the proton-conducting polymer can be prevented.

The invention according to the sixth aspect of the present invention is directed to a membrane-electrode assembly including the polymer electrolyte according to the first aspect of the present invention. This offers the remarkable advantage that degradation of the electrolyte can be prevented so that a high level of power generation characteristics and power generation stability can be ensured together with improved reliability during a long-term operation of a fuel cell.

The invention according to the seventh aspect of the present invention is directed to a fuel cell including the polymer electrolyte according to claim 1. This offers the remarkable advantage that degradation of the electrolyte can be prevented so that a high level of power generation characteristics and power generation stability can be more ensured together with improved reliability during a long-term operation of a fuel cell.

The polymer electrolyte according to the eighth aspect of the present invention is directed to a polymer electrolyte, including, as a main component, a crosslinked polymer that has a protic acid group in its molecular chain and is produced by a crosslinking reaction between a proton-conducting polymer and a crosslinking agent, wherein the crosslinking agent reacts with part of the proton-conducting polymer other than the protic acid group, and the proton-conducting polymer includes a structural unit represented by formula (2) below. The proton-conducting polymer is bonded through a moiety other than the protic acid group. This offers the remarkable advantages that the polymer can be crosslinked without reducing the ion exchange capacity or the proton conductivity and a polymer electrolyte exhibiting high proton conductivity even under low humidity conditions and having high durability can be obtained.

[Formula 4]

In the formula, A represents an electron-withdrawing group, B represents an electron-donating group, m and n each represent an integer of 0 to 10, and x and y each represent an integer of 1 to 4.

The polymer electrolyte according to the ninth aspect of the present invention is characterized in that A represents —CO— in formula (2). This offers the additional remarkable advantage that the hydrolysis resistance can be improved.

The polymer electrolyte according to the tenth aspect of the present invention is characterized in that B represents —O— in formula (2). This offers the additional remarkable advantage that the reactivity with radical species can be reduced.

The polymer electrolyte according to the eleventh aspect of the present invention is characterized in that formula (2) represents sulfonated (4-phenoxybenzoyl-1,4-phenylene). This offers the additional remarkable advantage that a high level of hydrolysis resistance and radical species resistance can be provided and high proton conductivity can be exhibited.

The polymer electrolyte according to the twelfth aspect of the present invention is characterized in that the proton-conducting polymer has a hydrogen ion exchange capacity of 0.5 meq/g to 5 meq/g. This offers the additional remarkable advantage that the polymer electrolyte can exhibit high proton conductivity and form a fuel cell with reduced internal resistance and high power density.

The polymer electrolyte according to the thirteenth aspect of the present invention is characterized in that the crosslinking agent has at least one methylol group in its molecule. The reaction proceeds not through the protic acid group of the proton-conducting polymer. This offers the additional remarkable advantage that the proton conductivity is not reduced by the reaction and the reaction is easily carried out by heating.

The polymer electrolyte according to the fourteenth aspect of the present invention is characterized in that the proton-conducting polymer and the crosslinking agent are chemically bonded to each other by heating. The reaction can be easily carried out by heating. This offers the additional remarkable advantage that the reaction can be easily and economically carried out with a simple apparatus or process.

The polymer electrolyte according to the fifteenth aspect of the present invention is characterized in that the heating is performed at a temperature of 60° C. to 250° C. This offers the additional remarkable advantage that the reaction can be easily carried out, while the elimination or decomposition reaction of the protic acid group of the proton-conducting polymer can be prevented.

The invention according to the sixteenth aspect of the present invention is directed to a membrane-electrode assembly including the polymer electrolyte according to the eighth aspect of the present invention. This offers the remarkable advantage that degradation of the electrolyte can be prevented so that a high level of power generation characteristics and power generation stability can be ensured together with improved reliability during a long-term operation of a fuel cell.

The invention according to the seventeenth aspect of the present invention is directed to a fuel cell including the polymer electrolyte according to the eighth aspect of the present invention. This offers the remarkable advantage that degradation of the electrolyte can be prevented so that a high level of power generation characteristics and power generation stability can be more ensured together with improved reliability during a long-term operation of a fuel cell.

DESCRIPTION OF THE PREFERRED EMBODIMENTS

The present invention will be described in detail below.
<Electrolyte (First Embodiment)>

The present invention relates to a polymer electrolyte for use in a polymer electrolyte fuel cell. The polymer electrolyte is a crosslinked polymer electrolyte including, as a main component, a crosslinked polymer that has a protic acid group in its molecule and is produced by a crosslinking reaction between a proton-conducting polymer and a crosslinking agent, wherein the crosslinking agent reacts with part of the proton-conducting polymer other than the protic acid group, and the proton-conducting polymer includes a structural unit represented by formula (1a) or (1b) below.

[Formula 5]

Formula (1a)

Formula (1b)

Figure 1:
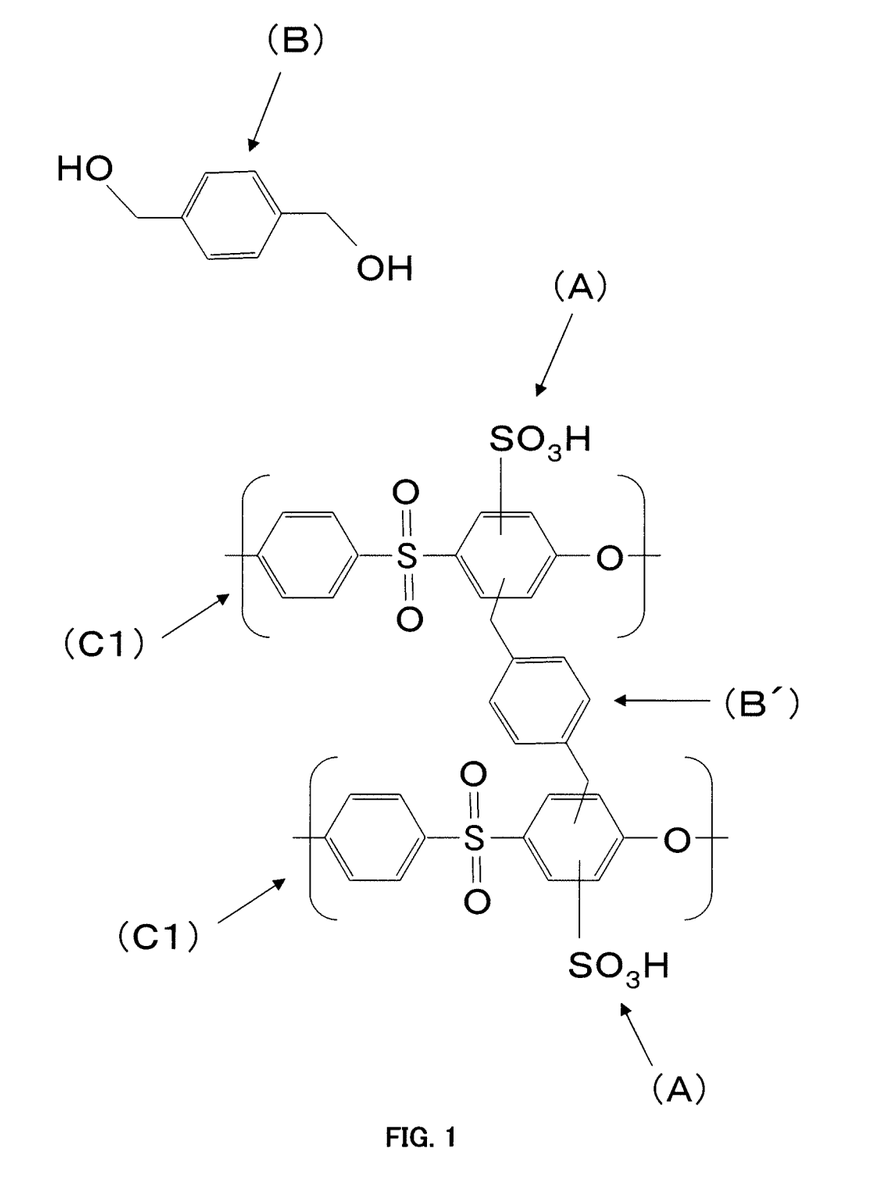
FIG. 1 is an explanatory diagram schematically showing the molecular structure of a polymer electrolyte according to the invention.

FIG. 1 is an explanatory diagram schematically showing the molecular structure of a polymer electrolyte according to the invention. For example, the polymer electrolyte shown in FIG. 1 is produced by mixing proton-conducting sulfonated polyethersulfone C1 having a sulfonic acid group A as a protic acid group with 1,4-benzenedimethanol B as a crosslinking agent having a methylol group and heat-treating the mixture so that a reaction can be carried out. The polymer electrolyte shown in FIG. 1 includes a plurality of proton-conducting sulfonated polyethersulfone moieties C1 chemically bonded at their aromatic ring moieties other than the sulfonic acid group A to one another through a residue B' of 1,4-benzenedimethanol.

Figure 2:
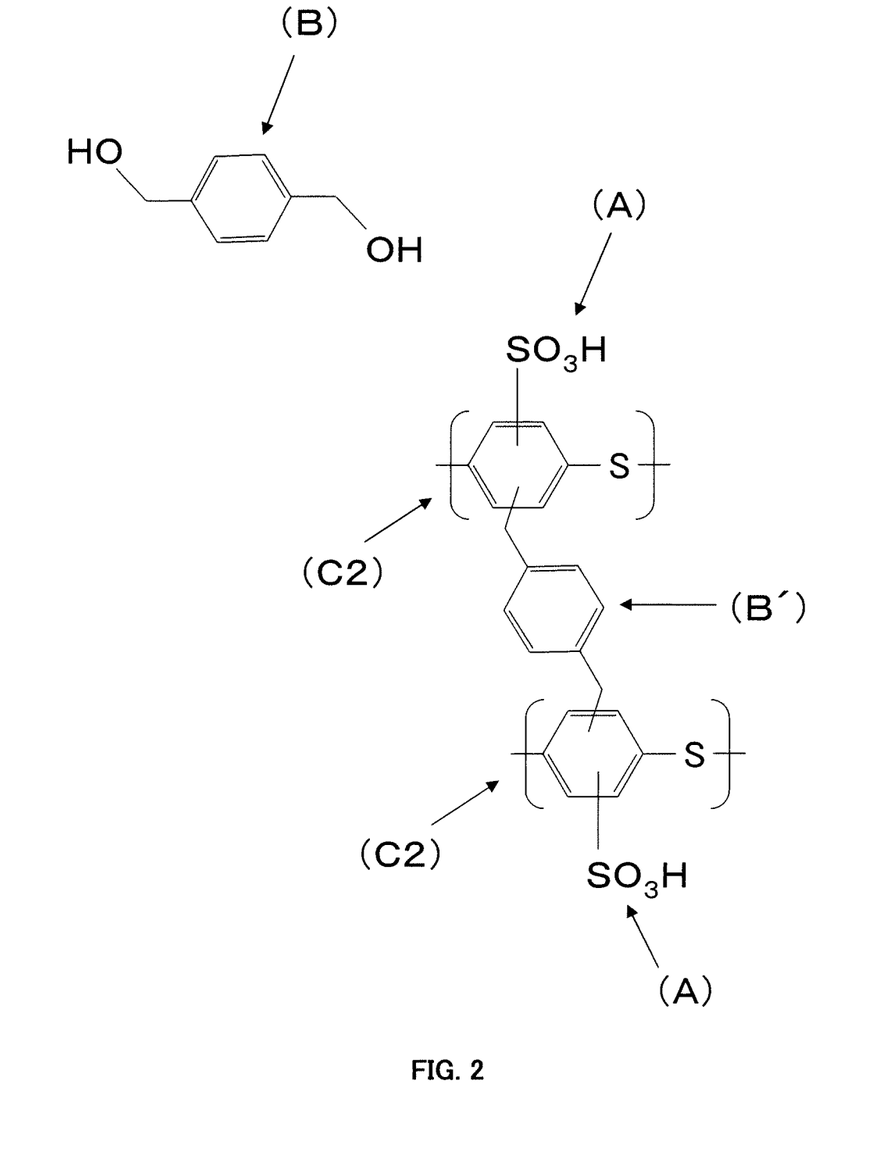
FIG. 2 is an explanatory diagram schematically showing the molecular structure of another polymer electrolyte according to the invention.

FIG. 2 is an explanatory diagram schematically showing the molecular structure of another polymer electrolyte according to the invention. For example, the polymer electrolyte shown in FIG. 2 is produced by mixing proton-conducting sulfonated polyphenylene sulfide C2 having a sulfonic acid group A as a protic acid group with 1,4-benzenedimethanol B as a crosslinking agent having a methylol group and heat-treating the mixture so that a reaction can be carried out. The polymer electrolyte shown in FIG. 2 includes a plurality of proton-conducting sulfonated polyphenylene sulfide moieties C2 chemically bonded at their aromatic ring moieties other than the sulfonic acid group A to one another through a residue B' of 1,4-benzenedimethanol.

The proton-conducting polymer having proton conductivity for use in the invention preferably has a hydrogen ion exchange capacity of 0.5 meq/g to 5 meq/g in view of ion conductivity.

If the hydrogen ion exchange capacity is less than 0.5 meq/g, the proton conductivity may be poor so that the resulting fuel cell may have high internal resistance and significantly reduced power density during use. If it is more than 5 meq/g, it may be difficult to form a polymer.

The basic structure of the proton-conducting polymer for use in an embodiment of the invention is preferably a polymer having the structural unit represented by formula (1a) or (1b) below. Any copolymer or derivative of such a polymer may also be used. A single type of such a polymer may be used, or two or more types of such polymers may be used in combination. Formula (1a) or (1b) is a general formula to illustrate the basic structure of the proton-conducting polymer, in which the protic acid group is omitted.

[Formula 6]

Formula (1a)

Formula (1b)

The proton-conducting polymer for use in the invention has a protic acid group introduced in the structure of formula (1a) or (1b). A sulfonic acid group (—SO$_3$H), a phosphoric acid group (—PO$_3$H), a carboxylic acid group (—COOH), or the like may be used as the protic acid group. In particular, a sulfonic acid group (—SO$_3$H) or a phosphoric acid group (—PO$_3$H) may be preferably used.

In order to improve the mechanical strength or the water resistance, the proton-conducting polymer may be used in combination with an additional polymer. Examples of the additional polymer include aromatic polyether, aromatic polyether ketone, aromatic polyether ether ketone, aromatic polyether sulfone, aromatic polysulfone, aromatic polyether nitrile, aromatic polyether-pyridine, aromatic polyimide, aromatic polyamide, aromatic polyamide-imide, aromatic polyazole, aromatic polyester, and aromatic polycarbonate. These polymers may be sulfonated or unsulfonated.

The crosslinking agent for use in the invention may be of any type that can react with part of the proton-conducting polymer other than the protic acid group not through the protic acid group and keep the proton conductivity of the proton-conducting material with no change before and after the reaction, and is not limited to these crosslinking agents. In particular, a crosslinking agent having a structure in which a methylol group represented by —CH$_2$OH is bonded to an aromatic ring is preferred, because it can easily react with the proton-conducting material to form a chemical bond, when heated.

In the invention, a compound having, in its molecule, at least one aromatic ring to which a methylol group is attached is more preferably used as the methylol group-containing crosslinking agent, because it can react with the proton-conducting polymer not through the protic acid group of the proton-conducting polymer, so that the proton conductivity can be prevented from being reduced by the reaction, and because it can easily react when heated.

In the invention, the reaction between the proton-conducting polymer and the crosslinking agent may be carried out by heating. The heating temperature is preferably from 60° C. to 250° C. In addition, the reaction is preferably carried out in the presence of an acid catalyst so that the reactivity can be increased.

The crosslinking agent is preferably used in an amount of 0.5 to 50% by weight, based on the amount of the proton-conducting polymer.

The weight average molecular weight of the polymer electrolyte of the invention is preferably, but not limited to, from 1,000 to 1,000,000.

The polymer electrolyte of the invention may be a copolymer including the structural unit represented by formula (1a) or (1b) and any other structural unit.

<Electrolyte (Second Embodiment)>

The present invention also relates to another polymer electrolyte for use in a polymer electrolyte fuel cell. The polymer electrolyte includes, as a main component, a crosslinked polymer that has a protic acid group in its molecular chain and is produced by chemical bonding between a proton-conducting polymer and a crosslinking agent, wherein the crosslinking agent is chemically bonded to part of the proton-conducting polymer other than the protic acid group, and the proton-conducting polymer includes a structural unit represented by formula (2) below.

[Formula 7]

In the formula, A represents an electron-withdrawing group, B represents an electron-donating group, m and n each represent an integer of 0 to 10, and x and y each represent an integer of 1 to 4.

Figure 3:
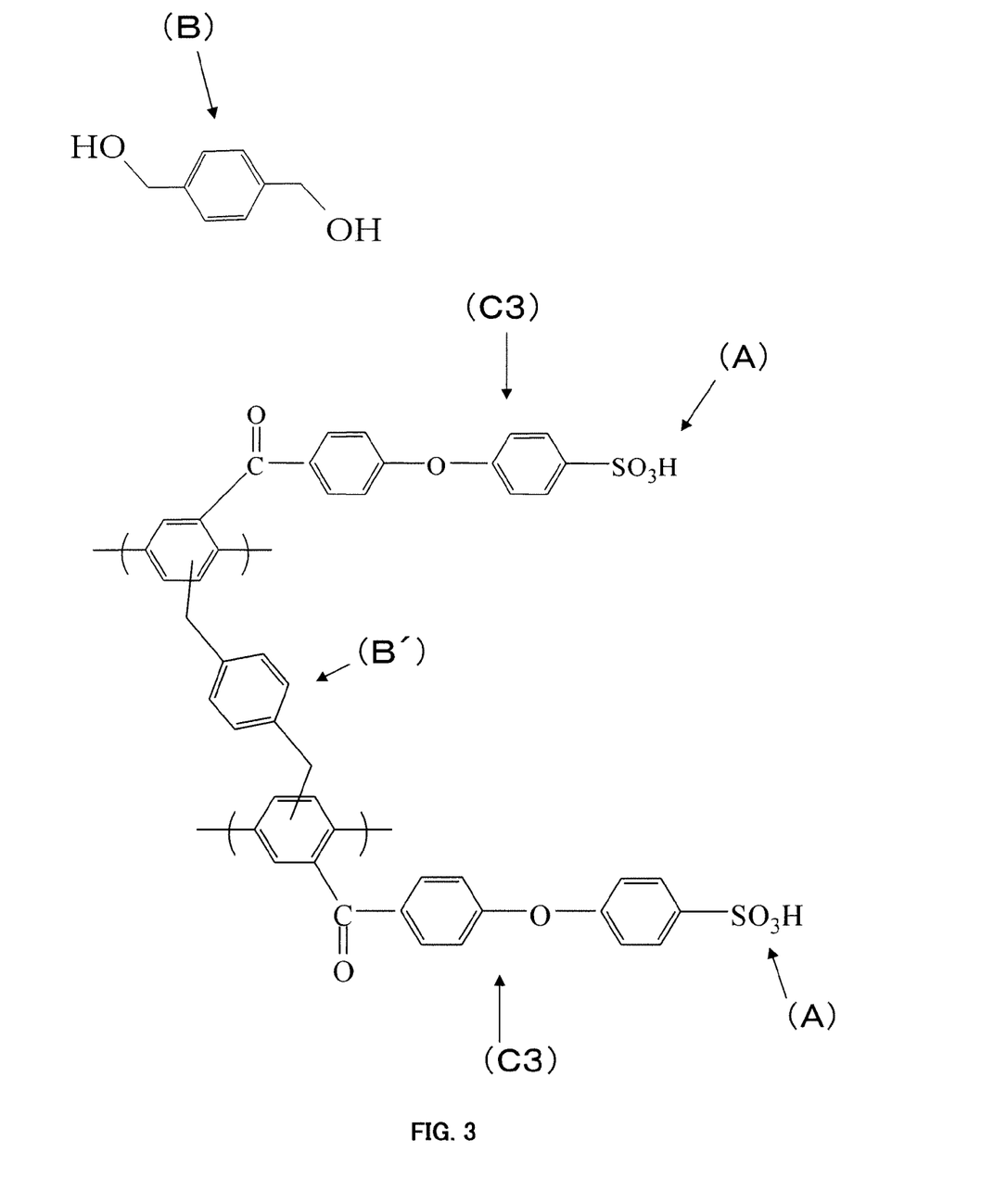
FIG. 3 is an explanatory diagram schematically showing the molecular structure of a further polymer electrolyte according to the invention.

FIG. 3 is an explanatory diagram schematically showing the molecular structure of a polymer electrolyte according to the invention. The polymer electrolyte shown in FIG. 3 is produced by mixing proton-conducting sulfonated poly(4-phenoxybenzoyl-1,4-phenylene) C3 having a sulfonic acid group A with 1,4-benzenedimethanol B as a crosslinking agent having a methylol group and heat-treating the mixture so that a reaction can be carried out. The polymer electrolyte shown in FIG. 3 includes a plurality of proton-conducting sulfonated poly(4-phenoxybenzoyl-1,4-phenylene) moieties C3 chemically bonded at their aromatic ring moieties other than the sulfonic acid group A to one another through a residue B' of 1,4-benzenedimethanol.

As shown in FIG. 3, the crosslinking reaction of sulfonated poly(4-phenoxybenzoyl-1,4-phenylene) is an electrophilic reaction, and therefore, the reaction proceeds at the aromatic ring in the vicinity of the ether bond having a high electron density or at the aromatic ring of the main chain.

The proton-conducting polymer having proton conductivity for use in the invention preferably has a hydrogen ion exchange capacity of 0.5 meq/g to 5 meq/g in view of ion conductivity.

If the hydrogen ion exchange capacity is less than 0.5 meq/g, the proton conductivity may be poor so that the resulting fuel cell may have high internal resistance and significantly reduced power density during use. If it is more than 5 meq/g, it may be difficult to form a polymer.

The basic structure of the proton-conducting polymer for use in the invention is preferably a polymer having the structural unit represented by formula (2) below. Any copolymer or derivative of such a polymer may also be used. A single type of such a polymer may be used, or two or more types of such polymers may be used in combination. Formula (2) is a general formula to illustrate the basic structure of the proton-conducting polymer, in which the protic acid group is omitted.

[Formula 8]

In order to improve the mechanical strength or the water resistance, the proton-conducting polymer may be used in combination with an additional polymer. Examples of the additional polymer include aromatic polyether, aromatic polyether ketone, aromatic polyether ether ketone, aromatic polyether sulfone, aromatic polysulfone, aromatic polyether nitrile, aromatic polyether-pyridine, aromatic polyimide, aromatic polyamide, aromatic polyamide-imide, aromatic polyazole, aromatic polyester, and aromatic polycarbonate. These polymers may be sulfonated or unsulfonated.

The crosslinking agent for use in the invention may be of any type that can react with part of the proton-conducting polymer other than the protic acid group not through the protic acid group and keep the proton conductivity of the proton-conducting material with no change before and after the reaction, and is not limited to these crosslinking agents. In particular, a crosslinking agent having a structure in which a methylol group represented by —CH$_2$OH is bonded to an aromatic ring is preferred, because it can easily react with the proton-conducting material to form a chemical bond, when heated.

In the invention, a compound having, in its molecule, at least one aromatic ring to which a methylol group is attached is more preferably used as the methylol group-containing crosslinking agent, because it can react with the proton-conducting polymer not through the protic acid group of the proton-conducting polymer, so that the proton conductivity can be prevented from being reduced by the reaction, and because it can easily react when heated.

In the invention, the reaction between the proton-conducting polymer and the crosslinking agent may be carried out by heating. The heating temperature is preferably from 60° C. to 250° C. In addition, the reaction is preferably carried out in the presence of an acid catalyst so that the reactivity can be increased.

The crosslinking agent is preferably used in an amount of 0.5 to 50% by weight, based on the amount of the proton-conducting polymer.

The weight average molecular weight of the polymer electrolyte of the invention is preferably, but not limited to, from 1,000 to 1,000,000.

The polymer electrolyte of the invention may be a copolymer including the structural unit represented by formula (2) and any other structural unit.

<Membrane-Electrode Assembly (MEA) and Fuel Cell>

The polymer electrolyte of the invention may be used for a fuel cell and a membrane-electrode assembly serving as a component of a fuel cell. Specifically, it may be used as an electrolyte material for a polymer electrolyte membrane. It may also be used as a polymer electrolyte in an electrode catalyst layer.

Figure 4:
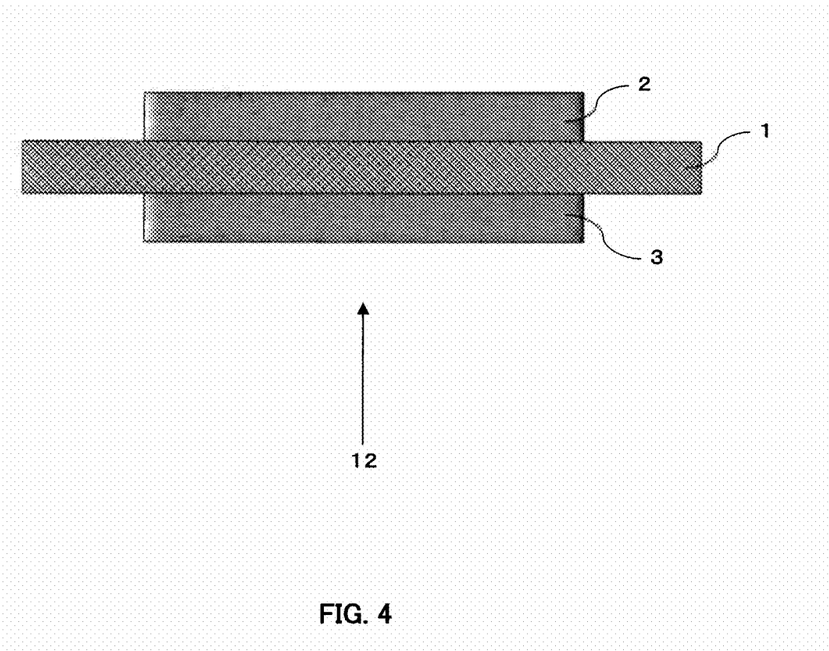
FIG. 4 is an explanatory cross-sectional view of a membrane-electrode assembly according to an embodiment of the invention.

FIG. 4 is an explanatory cross-sectional view of a membrane-electrode assembly according to an embodiment of the invention.

The membrane-electrode assembly of the invention includes the laminated structure shown in FIG. 4.

Using a conventional method, an air electrode catalyst layer 2 and a fuel electrode catalyst layer 3 are laminated on and bonded to both sides of a polymer electrolyte membrane 1 including the polymer electrolyte of the invention produced as described above, so that a membrane-electrode assembly 12 is formed. The electrode catalyst layers 2 and 3 each include carbon black particles as a conductive agent, a reaction catalyst and a polymer electrolyte. The polymer electrolyte contained in the electrolyte catalyst layer may be a proton-conducting polymer including the structural unit represented by formula (1a), (1b) or (2), or a polymer electrolyte according to the invention that is produced by a reaction between a proton-conducting polymer including the structural unit represented by formula (1a), (1b) or (2) and a crosslinking agent to form a chemical bond through part of the proton-conducting polymer other than the protic acid group.

Examples of the reaction catalyst that may be used in the invention include platinum group elements such as platinum, palladium, ruthenium, iridium, rhodium, and osmium, and metals such as iron, lead, copper, chromium, cobalt, nickel, manganese, vanadium, molybdenum, gallium, and aluminum, and alloys, oxides or complex oxides thereof. The catalyst preferably has a particle size of 0.5 to 20 nm, more preferably 1 to 5 nm, because an excessively large particle size may reduce the catalyst activity and an excessively small particle size may reduce the catalyst stability.

Carbon particles are generally used as the conductive agent with electron conductivity used in the invention to carry the reaction catalyst. The carbon particles may be of any type, as long as they are in the form of fine particles, have electrical conductivity and are unaffected by the catalyst. Examples that may be used include carbon black, graphite, black lead, activated carbon, carbon fibers, carbon nanotubes, and fullerene. The particle size of the carbon particles is preferably about 10 to about 1,000 nm, more preferably 10 to 100 nm, because an excessively small particle size may make it difficult to form an electron-conducting path and an excessively large particle size may form a thick electrode catalyst layer resulting in a large electric resistance.

Figure 5:
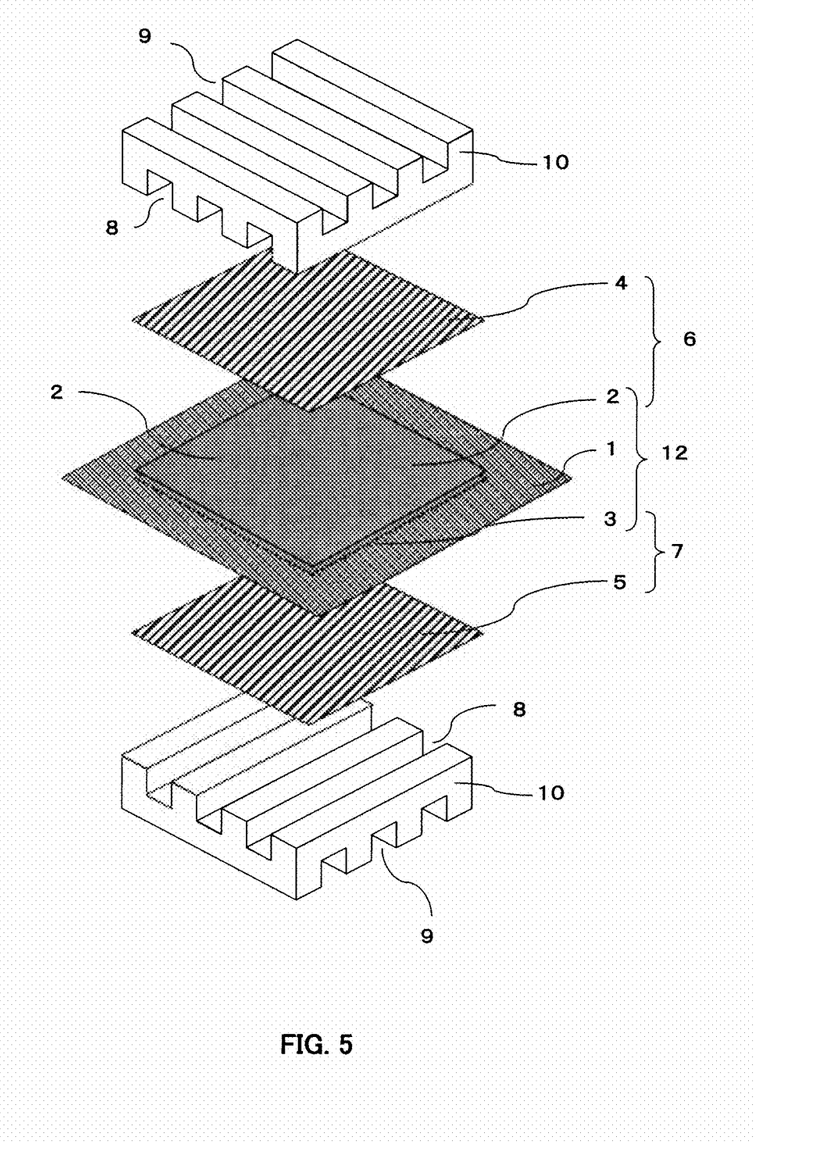
FIG. 5 is an exploded cross-sectional view showing the structure of a single cell of a polymer electrolyte fuel cell according to an embodiment equipped with the membrane-electrode assembly.

FIG. 5 is an exploded cross-sectional view showing the structure of a single cell of a polymer electrolyte fuel cell according to an embodiment equipped with the membrane-electrode assembly 12. An air electrode gas diffusion layer 4 and a fuel electrode gas diffusion layer 5 each having a structure including a carbon paper sheet coated with a mixture of carbon black and polytetrafluoroethylene (PTFE) are placed to face the air electrode catalyst layer 2 and the fuel electrode catalyst layer 3 of the membrane-electrode assembly 12, respectively, so that an air electrode 6 and a fuel electrode 7 are formed, respectively. The above structure is sandwiched between a pair of separators 10 each made of a conductive, gas-impermeable material and having gas flow channels 8 for reactant gas distribution, which face the air electrode gas diffusion layer 4 or the fuel electrode gas diffusion layer 5, and cooling water flow channels 9 formed on the opposite main surface for cooling water distribution, so that a single cell 11 is constructed. For electric power generation, an oxidant such as air or oxygen is supplied to the air electrode 6, while a hydrogen-containing fuel gas or an organic fuel is supplied to the fuel electrode 7.

An example of the method for manufacturing the membrane-electrode assembly (MEA) according to the invention will be further described. The membrane-electrode assembly (MEA) 12 may be manufactured using a method that includes: applying an ink composition containing a reaction catalyst, the conductive agent and a proton-conducting polymer having a protic acid group, to the gas diffusion layer 4 or 5 made of the porous conductive material or the like for uniformly delivering a fuel gas into the electrode catalyst layer 2 or 3; then drying the ink composition to form the electrode catalyst layer 2 or 3 thereon; then placing the proton-conducting crosslinked polymer electrolyte membrane 1 between the electrode catalyst layers 2 and 3; and bonding them to one another by hot pressing. The ink composition to form the electrode catalyst layer 2 or 3 on the gas diffusion layer 4 or 5 may be applied using an application method such as a doctor blade method, a screen printing method, or a spray method.

Alternatively, the MEA 12 may be manufactured by another method that includes forming the electrode catalyst layers 2 and 3 on both sides of the proton-conducting crosslinked polymer electrolyte membrane 1 by transfer or spraying and then holding the product between the gas diffusion layers 4 and 5.

EXAMPLES

The present invention will be more specifically described with the examples below, which are not intended to limit the scope of the invention.

Example 1

1 g of sulfonated polyethersulfone and 0.15 g of 1,4-benzenedimethanol (Tokyo Chemical Industry Co., Ltd.) as a crosslinking agent were mixed in an organic solvent.

Using the resulting solution, a film was then formed on a polyimide substrate by a casting method. After the solvent was removed by drying, the resulting film was subjected to hot pressing so that a reaction was allowed to proceed to produce a polymer electrolyte according to the invention.

The hot pressing was performed under the conditions: a pressing temperature of 120° C.; a pressing time of 3 hours; and a pressing pressure of 60 kgf/cm².

The resulting polymer electrolyte was immersed in dimethylformamide (DMF). As a result, the polymer electrolyte was not dissolved, and it was demonstrated that the polymer electrolyte was crosslinked. The resulting polymer electrolyte was stirred for two days in an aqueous 2N sodium nitrate solution and then removed by filtration with a filter. After the removal of the polymer electrolyte, the acid solution was titrated with an aqueous sodium hydroxide solution. The ion exchange capacity of the polymer electrolyte was calculated from the point of neutralization. The resulting polymer electrolyte had a hydrogen ion exchange capacity of 0.7 meq/g.

Comparative Example 1

A proton-conducting polymer electrolyte was obtained using the similar process of Example 1, except that the crosslinking agent was not added. The resulting polymer electrolyte was immersed in dimethylformamide (DMF). As a result, the polymer electrolyte was dissolved in DMF, and it was demonstrated that the sulfonated polyethersulfone was uncrosslinked. The hydrogen ion exchange capacity of the resulting polymer electrolyte was determined by the similar method as that in Example 1 to be 0.8 meq/g.

Example 2

1 g of sulfonated polyphenylene sulfide and 0.15 g of 1,4-benzenedimethanol (Tokyo Chemical Industry Co., Ltd.) as a crosslinking agent were mixed in an organic solvent.

Using the resulting solution, a film was then formed on a polyimide substrate by a casting method. After the solvent was removed by drying, the resulting film was subjected to hot pressing so that a reaction was allowed to proceed to produce a polymer electrolyte according to the invention.

The hot pressing was performed under the conditions: a pressing temperature of 120° C.; a pressing time of 3 hours; and a pressing pressure of 60 kgf/cm².

The resulting polymer electrolyte was immersed in dimethylformamide (DMF). As a result, the polymer electrolyte was not dissolved, and it was demonstrated that the polymer electrolyte was crosslinked. The resulting polymer electrolyte was stirred for two days in an aqueous 2N sodium nitrate solution and then removed by filtration with a filter. After the removal of the polymer electrolyte, the acid solution was titrated with an aqueous sodium hydroxide solution. The ion exchange capacity of the polymer electrolyte was calculated from the point of neutralization. The resulting polymer electrolyte had a hydrogen ion exchange capacity of 2.0 meq/g.

Comparative Example 2

A proton-conducting polymer electrolyte was obtained using the similar process of Example 2, except that the crosslinking agent was not added. The resulting polymer electrolyte was immersed in dimethylformamide (DMF). As a result, the polymer electrolyte was dissolved in DMF, and it was demonstrated that the sulfonated polyphenylene sulfide was uncrosslinked. The hydrogen ion exchange capacity of the resulting polymer electrolyte was determined by the similar method as that in Example 1 to be 1.8 meq/g.

The sulfonated polyethersulfone and the sulfonated polyphenylene sulfide each have an —$SO_2$— group serving as an electron-withdrawing group in the main chain. With a crosslinking agent having a methylol group in its molecule, it was made possible to carry out the crosslinking reaction through a moiety other than the protic acid group and to form a crosslinked polymer electrolyte in the examples of the invention, even when the main chain had an —$SO_2$— group serving as an electron-withdrawing group.

Example 3

1 g of sulfonated poly(4-phenoxybenzoyl-1,4-phenylene) and 0.15 g of 1,4-benzenedimethanol (Tokyo Chemical Industry Co., Ltd.) as a crosslinking agent were mixed in an organic solvent.

Using the resulting solution, a film was then formed on a polyimide substrate by a casting method. After the solvent was removed by drying, the resulting film was subjected to hot pressing so that a reaction was allowed to proceed to produce a proton-conducting polymer electrolyte according to the invention.

The hot pressing was performed under the conditions: a pressing temperature of 120° C.; a pressing time of 3 hours; and a pressing pressure of 60 kgf/cm².

The resulting polymer electrolyte was immersed in dimethylformamide (DMF). As a result, the polymer electrolyte was not dissolved, and it was demonstrated that the polymer electrolyte was crosslinked. The resulting polymer electrolyte was stirred for two days in an aqueous 2N sodium nitrate solution and then removed by filtration with a filter. After the removal of the polymer electrolyte, the acid solution was titrated with an aqueous sodium hydroxide solution. The ion exchange capacity of the polymer electrolyte was calculated from the point of neutralization. The resulting polymer electrolyte had a hydrogen ion exchange capacity of 2.2 meq/g, and a proton conductivity of 0.13 S/cm at 80° C. and 95% RH and 0.012 S/cm at 80° C. and 50% RH.

The proton conductivity was determined as follows. The polymer electrolyte was brought into contact with four platinum wires arranged at intervals of 5 mm, and measurement was performed using a frequency characteristic analyzer (Frequency Response Analyzer 5058, NF ELECTRONIC INSTRUMENTS). The resistance value was determined from the resulting Cole-Cole plots, and then the proton conductivity was calculated.

Comparative Example 3

A proton-conducting polymer electrolyte was obtained using the similar process of Example 3, except that the crosslinking agent was not added. The resulting polymer electrolyte was immersed in dimethylformamide (DMF). As a result, the polymer electrolyte was dissolved, and it was demonstrated that the polymer electrolyte was uncrosslinked. The hydrogen ion exchange capacity of the resulting polymer electrolyte was determined by the similar method as that in Example 1 to be 2.4 meq/g. Its proton conductivity was 0.10 S/cm at 80° C. and 95% RH and 0.010 S/cm at 80° C. and 50% RH.

In the case where a crosslinking agent having a methylol group in its molecule is added to the sulfonated poly(4-phenoxybenzoyl-1,4-phenylene), the crosslinking agent reacts with an aromatic ring in the main chain or an aromatic ring near an ether bonding, which has a high level of electron density, so that it was made possible to carry out the crosslinking reaction through a moiety other than the protic acid group and to form a crosslinked polymer electrolyte in the example of the invention.

What is claimed is:

1. A polymer electrolyte comprising a crosslinked polymer, the crosslinked polymer comprising polymers having a molecular chain including a structural unit of formula 1,
   protic acid groups being introduced to many sites in the molecular chain,
   the polymers being crosslinked to one another through a 1,4-benzenedimethylene group, and
   the crosslinked polymer including a structural unit represented by formula 2, wherein each of the formula 1 and the formula 2 is represented either by formula (1a) below and formula (2a) below or by formula (1b) below and formula (2b) below:

[Formula 1]

Formula 1(a)

Formula 1(b)

[Formula 2]

Formula (2a)

Formula (2b)

2. The polymer electrolyte according to claim 1, wherein the crosslinked polymer has a hydrogen ion exchange capacity of 0.5 meq/g to 5 meq/g.

3. A membrane-electrode assembly comprising the polymer electrolyte according to claim 1.

4. A fuel cell comprising the polymer electrolyte according to claim 1.

5. The polymer electrolyte according to claim 1, wherein the crosslinked polymer has a weight-average molecular weight in the range of 1000-1000000.

6. A polymer electrolyte comprising a crosslinked polymer, the crosslinked polymer comprising polymers having a molecular chain including a structural unit of formula 3,
   the polymers being crosslinked to one another through a 1,4-benzenedimethylene group, and
   the crosslinked polymer including one or more structural unit(s) of formula 4, wherein each of the formula 3 and the formula 4 is represented either by formula (3a) below and formula (4a) below or by formula (3b) below and formula (4b) below:

[Formula 3]

Formula (4b)

wherein A represents an electron-withdrawing group, B represents an electron-donating group, m and n each represent an integer of 0 to 10, and x and y each represent an integer of 1 to 4.

7. The polymer electrolyte according to claim 6, wherein A represents —CO— in formula 3 and formula 4.

8. The polymer electrolyte according to claim 6, wherein B represents —O— in formula 3 and formula 4.

9. The polymer electrolyte according to claim 6, wherein the crosslinked polymer has a hydrogen ion exchange capacity of 0.5 meq/g to 5 meq/g.

10. The polymer electrolyte according to claim 6, wherein the crosslinked polymer has a weight-average molecular weight in the range of 1000-1000000.

11. A membrane-electrode assembly comprising the polymer electrolyte according to claim 6.

12. A fuel cell, comprising the polymer electrolyte according to claim 6.

13. A polymer electrolyte comprising a crosslinked polymer which includes any one of structural units represented by formula 5 below:

[Formula 5]

formula 6 below;

[Formula 6]

, or formula 7 below:

[Formula 7]

wherein A represents an electron-withdrawing group, B represents an electron-donating group, m and n each represent an integer of 0 to 10, and x and y each represent an integer of 1 to 4.

* * * * *